(12) United States Patent
Ramaley et al.

(10) Patent No.: US 7,401,291 B2
(45) Date of Patent: *Jul. 15, 2008

(54) REVIEWING AND MERGING ELECTRONIC DOCUMENTS

(75) Inventors: Alan Ramaley, Seattle, WA (US); Suresh Tharamal, Sammamish, WA (US); Sean E. McAteer, Seattle, WA (US); Thomas W. Olsen, Issaquah, WA (US); Valerie D. Serdy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 10/958,471

(22) Filed: Oct. 4, 2004

(65) Prior Publication Data

US 2005/0044492 A1    Feb. 24, 2005

Related U.S. Application Data

(63) Continuation of application No. 09/575,516, filed on May 22, 2000, now Pat. No. 6,931,592.

(51) Int. Cl.
*G06F 17/21* (2006.01)
*G06F 17/24* (2006.01)

(52) U.S. Cl. ................... 715/255; 715/229; 715/256; 715/271; 715/764; 715/771

(58) Field of Classification Search ............... 715/511, 715/530, 531, 540, 229, 255, 256, 271, 764, 715/771

See application file for complete search history.

(56) References Cited

U.S. PATENT DOCUMENTS

| 4,912,637 | A | * | 3/1990 | Sheedy et al. ............... 707/203 |
| 5,040,142 | A | * | 8/1991 | Mori et al. .................. 715/511 |
| 5,671,428 | A | * | 9/1997 | Muranaga et al. ........... 345/751 |
| 5,809,513 | A | * | 9/1998 | Okishima .................... 715/530 |
| 5,835,601 | A | * | 11/1998 | Shimbo et al. .............. 713/165 |
| 5,890,177 | A | * | 3/1999 | Moody et al. ............... 715/511 |
| 6,067,551 | A | * | 5/2000 | Brown et al. ................ 707/203 |
| 6,070,175 | A | * | 5/2000 | Mezei ........................ 715/500 |
| 6,584,466 | B1 | * | 6/2003 | Serbinis et al. ............. 707/10 |

OTHER PUBLICATIONS

Jan Weingarten, teach yourself . . . WordPerfect 6.1 for Windows, 1995, MIS Press, First, p. 44 and 277.*
Novell, Press Release, 1997, Novell (http://www.novell.com/news/press/archive/1997/05/pr97077.html).*
Netscape Communications Corporation, Netscape Navigtor Gold, 1996, Version 3.01 Gold, Screenshots.*

* cited by examiner

*Primary Examiner*—Stephen Hong
*Assistant Examiner*—Joshua D. Campbell
(74) *Attorney, Agent, or Firm*—Merchant + Gould; Ryan T. Grace

(57) ABSTRACT

A system and method for reviewing an electronic document. A copy of an electronic document is sent to a reviewer, the copy of the electronic document having a first property identifying the location of the electronic document in the memory and indicating that review of the copy has been requested. The reviewer uses an application program to open the copy of the electronic document. The application program detects properties and in response to the first property, automatically displays a review toolbar. The edited electronic document is then sent back to the author having at least a first property. The application program executed by the author detects the properties and in response to the first property, retrieves the original electronic document from the memory and automatically prompts the author to merge the edited electronic document into the electronic document.

22 Claims, 8 Drawing Sheets

Author Receives the Edited Electronic Document from Reviewer

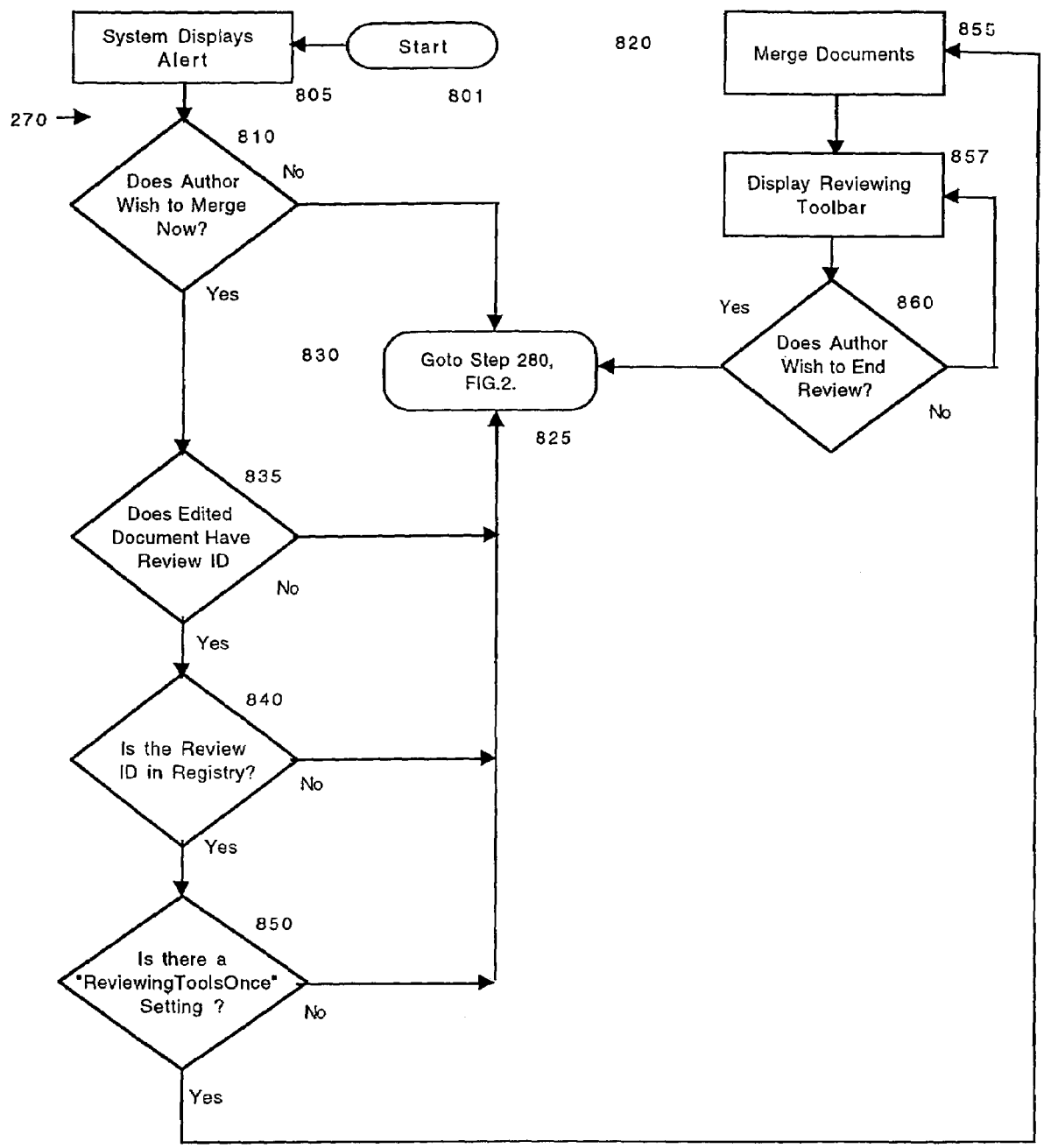

REVIEWING AND MERGING ELECTRONIC DOCUMENTS

REFERENCE TO RELATED APPLICATION

This application is a continuation of application Ser. No. 09/575,516, filed on May 22, 2000, which application is incorporated herein by reference.

TECHNICAL FIELD

The present invention relates generally to reviewing and merging electronic documents in a computer system. More particularly, the present invention relates to automatically displaying the reviewing features of an application program, and facilitating the merger of an electronic document with an original electronic document.

BACKGROUND OF THE INVENTION

Authors of documents typically from time to time require the input of others with respect to a particular document the author is preparing. In performing this collaborative effort, documents are sent from one person to another with the understanding that the receiver of the document will review it, make changes as the receiver sees fit, and return the document to the originator who will generally be the author of the original document. This exchange may be repeated several times and the document may be sent to more than one person to be reviewed and edited.

A common practice is to create an electronic document using a computer implemented application program. Once the document has been created, it is sent to a reviewer who can open the document within a compatible application program. With the document opened, the reviewer may review the document and make edits that may include comments within the text. If special editing features are available within the application program, the reviewer must be familiar enough with the application program to initiate the user interfaces for the features. After all appropriate edits are completed, the reviewer may return a copy of the edited electronic document to the author.

Once the author receives the copy of the edited electronic document, the author must locate on disk or other memory device the electronic document that was originally sent for review. After the electronic document is opened, the author must merge the changes received from the edited electronic document into the electronic document. This can be performed in many different ways. First, the author may simply review the two documents and manually edit the electronic document to reflect the changes received in the edited electronic document. If the application program contains a feature for merging and the author is familiar with the initiation of this feature, the electronic document can be modified to reflect the changes in the edited electronic document utilizing the merging feature.

Regardless of how the document is merged, the author must manually search for the electronic document on disk or other memory device and must be familiar with the initiation of the merging feature of the application program if in fact it contains such a merging feature. In addition, with respect to the reviewing of the document, the reviewer must also be aware of any special reviewing features of the application program and how to initiate their user interfaces as well.

Accordingly, there remains a need in the art for automatically displaying reviewing features within application programs, automatically locating an original electronic document once the reviewed document has been returned to a computer system, and automatically displaying document merging features within an application program.

SUMMARY OF THE INVENTION

The present invention fulfills the need in the art for automatically displaying reviewing features within application programs, automatically locating an original electronic document once the reviewed document has been returned to a computer system, and automatically displaying document merging features within an application program.

In accordance with one aspect of the present invention, a system and method are provided for reviewing and editing an electronic document. A copy of the electronic document is received from the author's computer. The electronic document has a first property identifying the location of the electronic document on disk or other memory device. This property also indicates that the copy of the electronic document is to be reviewed. The first property may be a unique identification number and may be a custom OLE document property. In addition to the first property, a second property may be added indicating the electronic mail address from which the copy of the electronic document was sent. The second property may be a custom OLE document property as well. The first and second properties may be added to the document in response to detecting that the electronic document is attached to an electronic mail message, in response to detecting that a selectable control element corresponding to the electronic document is dragged into an electronic mail message, or in response to detecting that a portion of the electronic document is pasted into an electronic mail message. The first and second properties may also be added in response to a "send for review" user input.

In response to receiving the copy of the electronic document, the copy of the electronic document is opened and displayed by an application program. The application program is configured to detect the first property and in response thereto, to display on the display device a review toolbar comprising selectable control elements corresponding to document review operations. The review tool bar may be continuously displayed until the reviewer generates a command to dismiss it. An edited electronic document is created for editing the copy of the electronic document. Finally the edited electronic document having the first property and second property is sent back to the author's computer.

Another aspect of the invention involves sending to a reviewer a copy of an electronic document, the copy having a first property identifying the location of the electronic document on disk or other memory device and also indicating that review of the copy has been requested. The first property may be a unique identification number and may also be custom OLE document properties. In addition to the first property, a second property may be added indicating the electronic mail address from which the copy of the electronic document was sent. The second property may be a custom OLE document property as well. The first and second property may be added to the document when the document is attached to an electronic mail message, when a selectable control element corresponding to the electronic document is dragged into an electronic mail message, or by when the electronic document is pasted into an electronic mail message. The first and second property may be added in response to a "send for review" user input command.

After the document is reviewed and edited, the edited electronic document having the first property is returned to the author. The edited electronic document may also include the second property. Based on the first property identifying the memory location of the original electronic document, the original electronic document is retrieved from the disk or other memory device and may be automatically merged with the edited electronic document.

These and other aspects and features of the present invention will be readily apparent after an examination of the following detailed description of the exemplary embodiments.

BRIEF DESCRIPTION OF THE DRAWINGS

FIG. 3 through 8 are flow charts that illustrates in more detail the general operation of the exemplary embodiment of the present invention as shown in FIG. 2.

DETAILED DESCRIPTION OF THE EXEMPLARY EMBODIMENTS

The present invention is directed to a system and method for reviewing and merging electronic documents. In one embodiment, the present invention is incorporated into the "OFFICE 2000" suite of application programs that is marketed by Microsoft Corporation of Redmond, Wash. Briefly described, the invention provides for automatic display of reviewing features within application programs, automatic location of an original electronic document once a reviewed document has been returned to a computer system, and automatic display of document merging features within an application program. For example, an author may choose to have a particular document reviewed. Once an electronic document has been chosen, the author will identify the document as one to be reviewed and send it to a reviewer. In an exemplary embodiment, the copy of the electronic document is sent via electronic mail. However, those skilled in the art will appreciate that other methods and protocols of sending documents may be employed such as electronic facsimile, routing slips, ftp, http and the like. Once the document is attached to an electronic mail note, properties are automatically added to the document. Properties added to the document may include a property identifying the location of the document in memory on the author's computer and a property identifying the author's electronic mail address may be added.

When the document is sent to and received by the reviewer, it is opened in an appropriate application software. The application program is configured to detect the properties of the document. In response to detecting the first property indicating that the document was marked for review, a reviewing tool bar is automatically displayed for the reviewer. Once the document has been reviewed and edited, it is sent back to the author. The properties persist in the edited electronic document and are detected by the author's application program when the edited document is opened. The first property allows the original electronic document to be located in the memory of the author's computer. The first property also triggers the application program to automatically prompt the author to merge the edited electronic document with the original electronic document.

Figure 1:
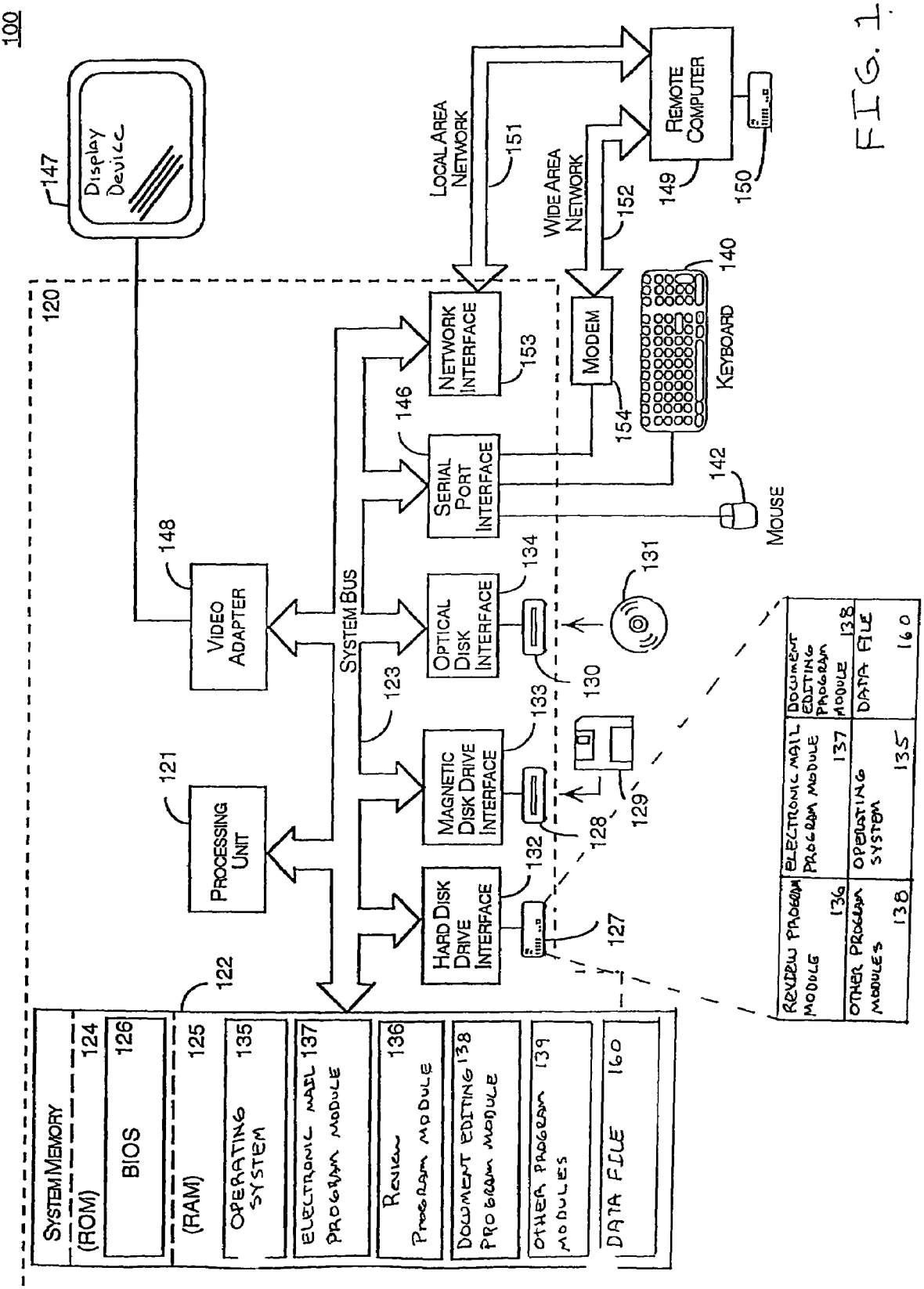
FIG. 1 is a functional block diagram of an exemplary operating environment for implementation of the exemplary embodiments of the present invention.

The description of the exemplary embodiment of the present invention will hereinafter refer to the drawing, in which like numerals indicate like elements throughout the several figures. Beginning with FIG. 1, an exemplary operating environment for implementation of an exemplary embodiment of the present invention is shown. Within the exemplary operating environment, the present invention may operate to facilitate the review of an electronic document, the creation of an edited electronic document and the merging of the edited electronic document with the electronic document. However, those skilled in the art should appreciate that the invention may be practiced in any type of computer operating environment such as hand-held devices, multiprocessor systems, microprocessor-based or programmable consumer electronics, minicomputers, mainframe computers, and the like. The invention may also be practiced in distributed computing environments where tasks are performed by remote processing devices The exemplary embodiment of the present invention will be described in the general context of a review program module 136 which facilitates review of an electronic document, interacts with a document editing application program 138 and an electronic mail application program 137, in order to create an edited electronic document, and merger of the edited electronic document with the electronic document. Those skilled in the art will recognize that the invention may be implemented in combination with various other program modules 139. Generally, program modules include routines, programs, components, data structures, etc. that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

An exemplary operating environment 100 for implementing the invention includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. For example, a data file 160 comprising an electronic document may be stored in the RAM 125 of hard disk 127 of the personal computer 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the drives and RAM 125, including an operating system 135, review program module 136, an electronic mail program module 137, a document editing program module 138, and other program modules 139. In particular, the review program module 136 which facilitates review of an electronic document, interacts with the document editing application program 138 and the electronic mail application program 137, in order to create an edited electronic document, and merger of the edited electronic document with the electronic document. An exemplary embodiment of the review program module 136 will be described in detail with reference to FIG. 2.

Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A display device 147 or other type of device such as a monitor is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. For example, the remote memory storage device 150 my store a document editing program 138, an electronic mail application program 137 and a review program 136. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Notwithstanding the broad applicability of the principles of the present invention, it should be understood that the configuration of the exemplary embodiment as a review program module 136 for widely-used personal computer systems 120 provides significant advantages. In particular, the review program module 136, comprising computer-implemented instructions for performing the method of the present invention, described in this specification, is specifically designed to exhibit acceptable memory-use and performance characteristics when implemented on the conventional personal computer system 120. In so configuring the review program module 136, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Figure 2:
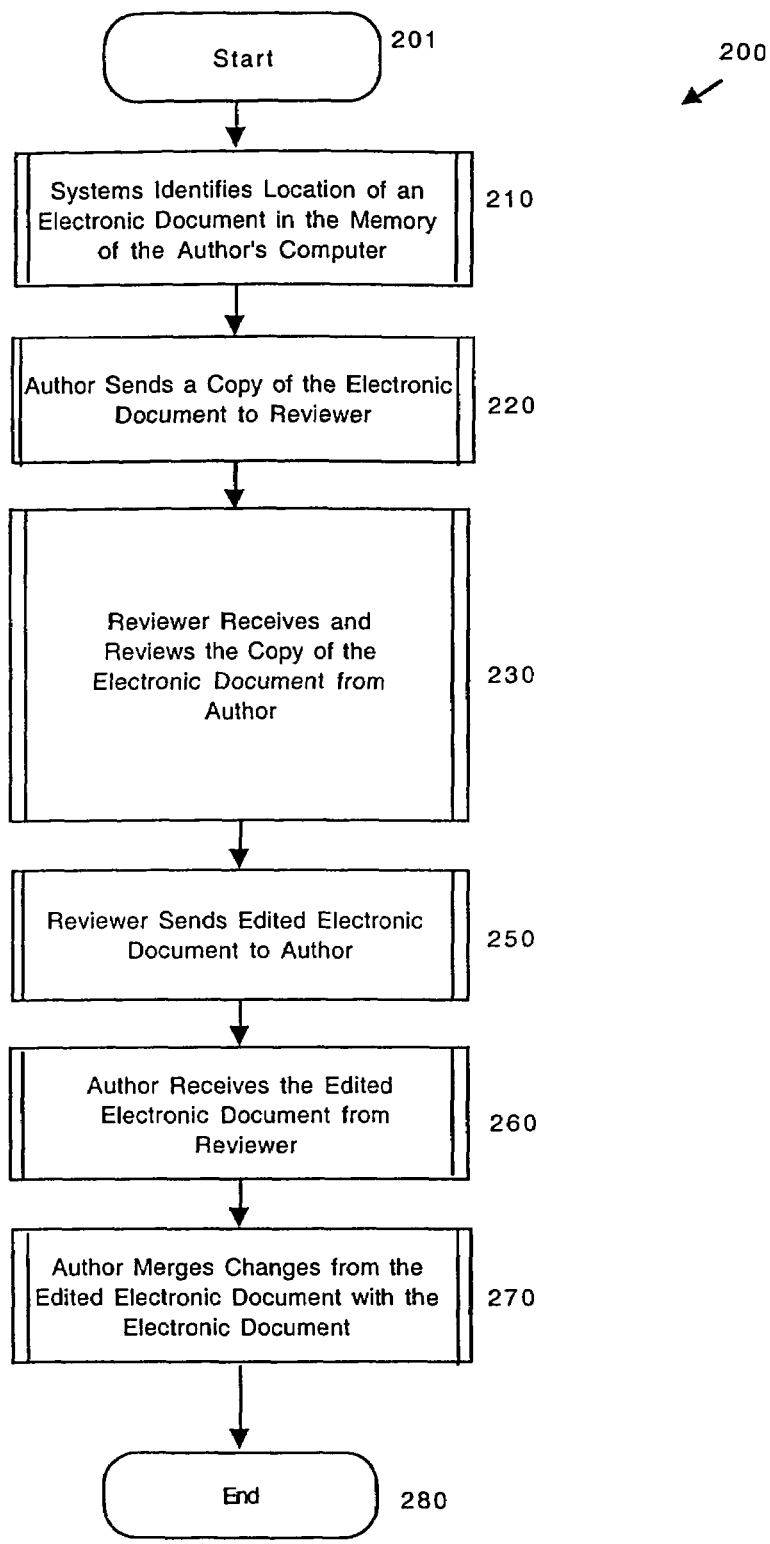
FIG. 2 is a flow chart that illustrates the general operation of an exemplary embodiment of the present invention.

FIG. 2 is a flow chart setting forth the general steps involved in a method for reviewing an electronic document. The exemplary method 200 is an overview of a typical document review process. The implementation of the steps of method 200 in accordance with an exemplary embodiment of the present invention will be described in greater detail in FIG. 3 through FIG. 8.

Figure 3:
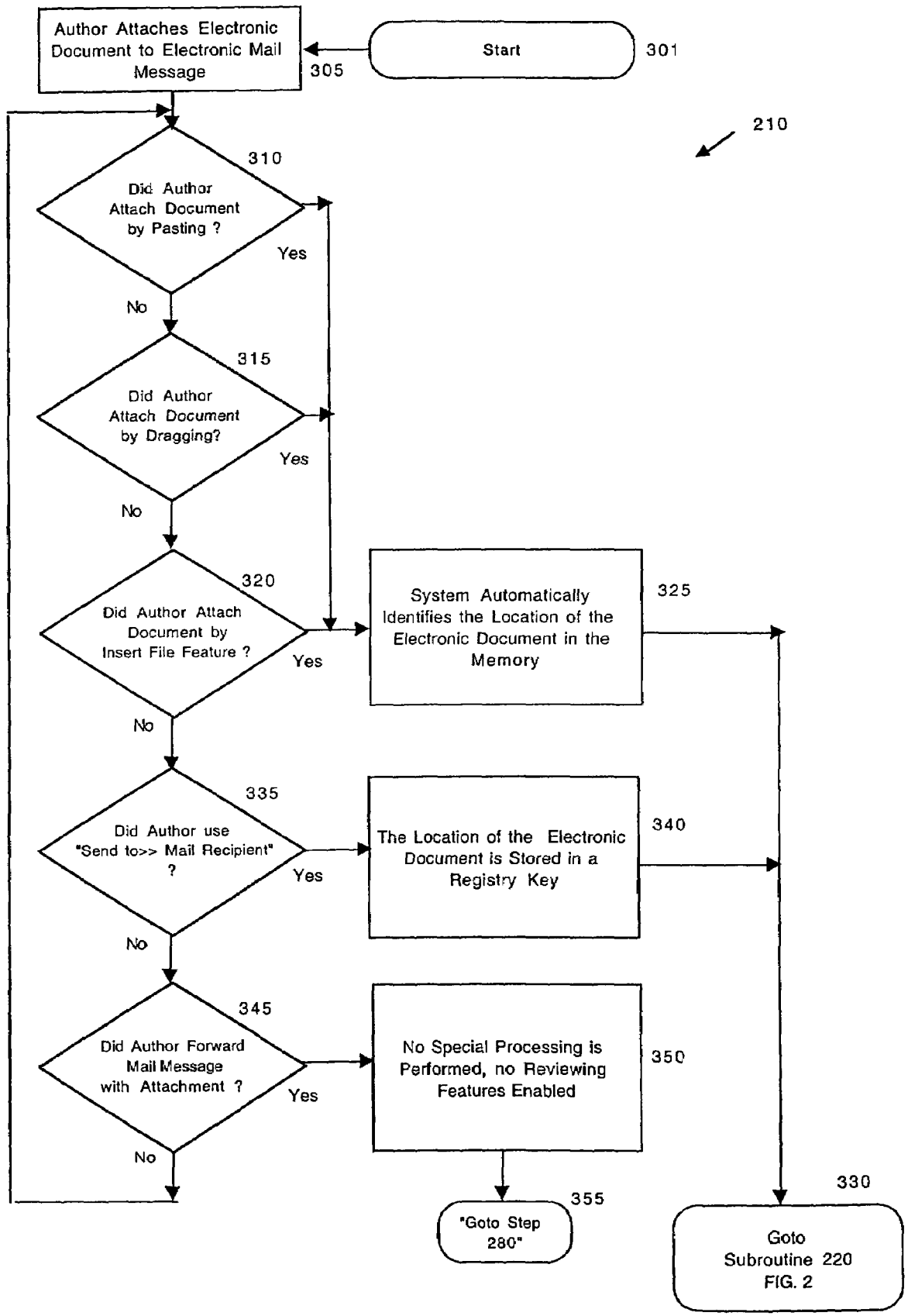
Figure 4:
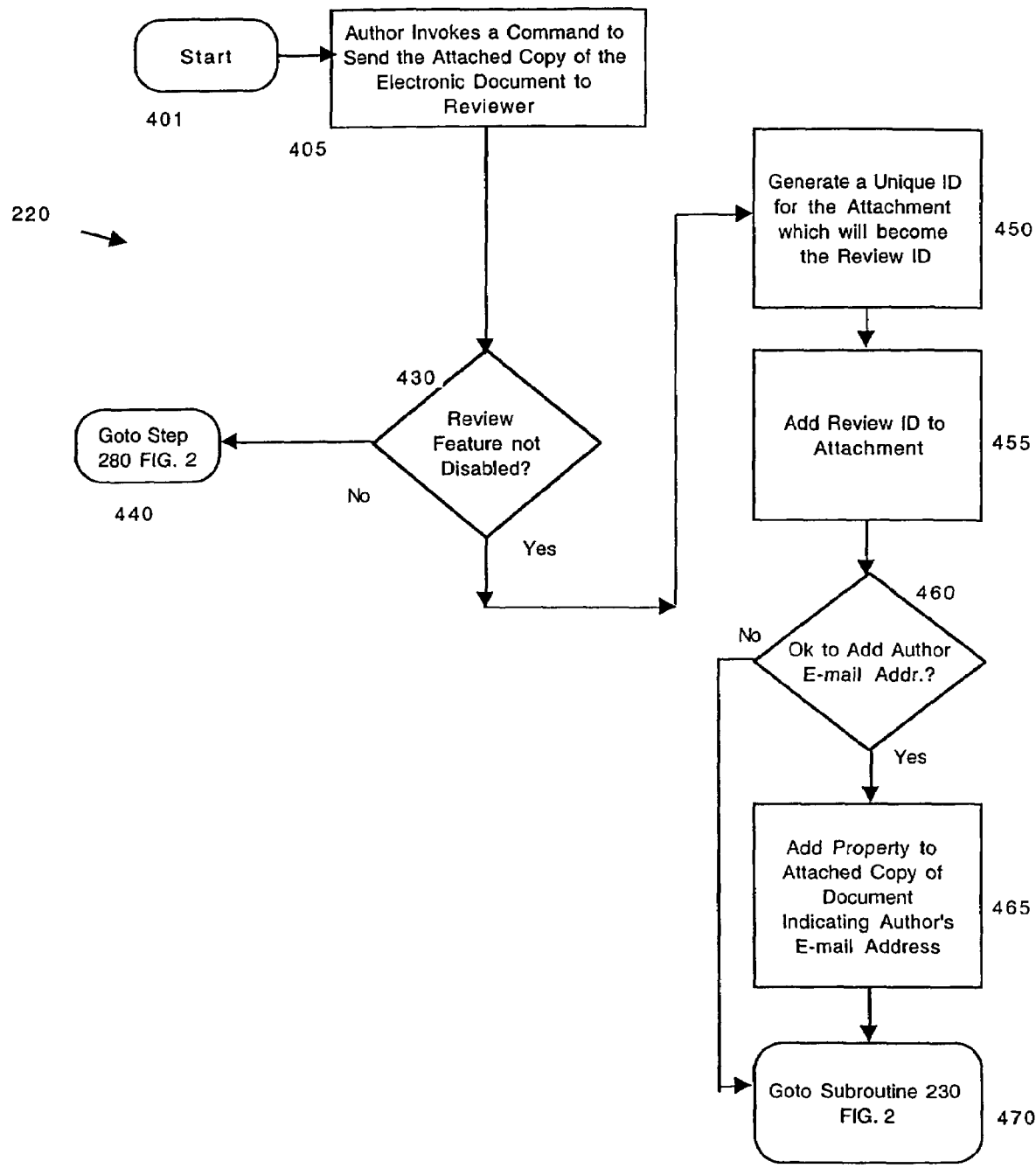
Figure 5:
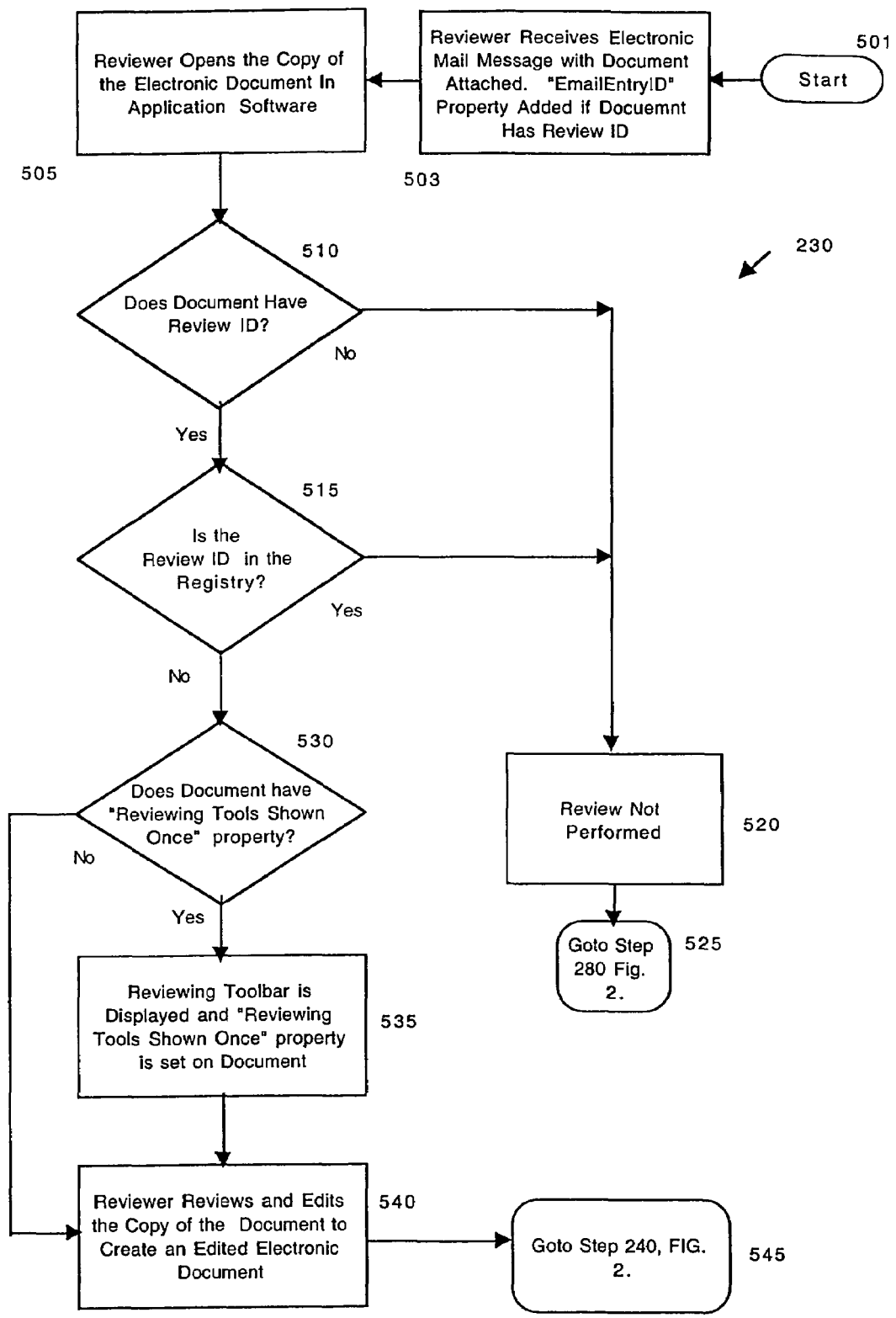

Exemplary method 200 begins at starting block 201 and proceeds to subroutine 210 where the location of an electronic document in the memory of the author's computer is identified. The steps comprising subroutine 210 are shown in FIG. 3 and will be described in greater detail below. Next, the method proceeds to subroutine 220 where the author sends a copy of the electronic document to a reviewer. The copy of the electronic document in marked with properties indicating that review is requested and indicating the location of the electronic document in the author's memory. The steps of subroutine 220 are shown in FIG. 4 and will be described in greater detail below. The method continues to subroutine 230 where a reviewer receives the copy of the electronic document from the author and then edits the copy of the electronic document received from the author. The steps of subroutine 230 are shown in FIG. 5 and will be described in greater detail below.

Figure 6:
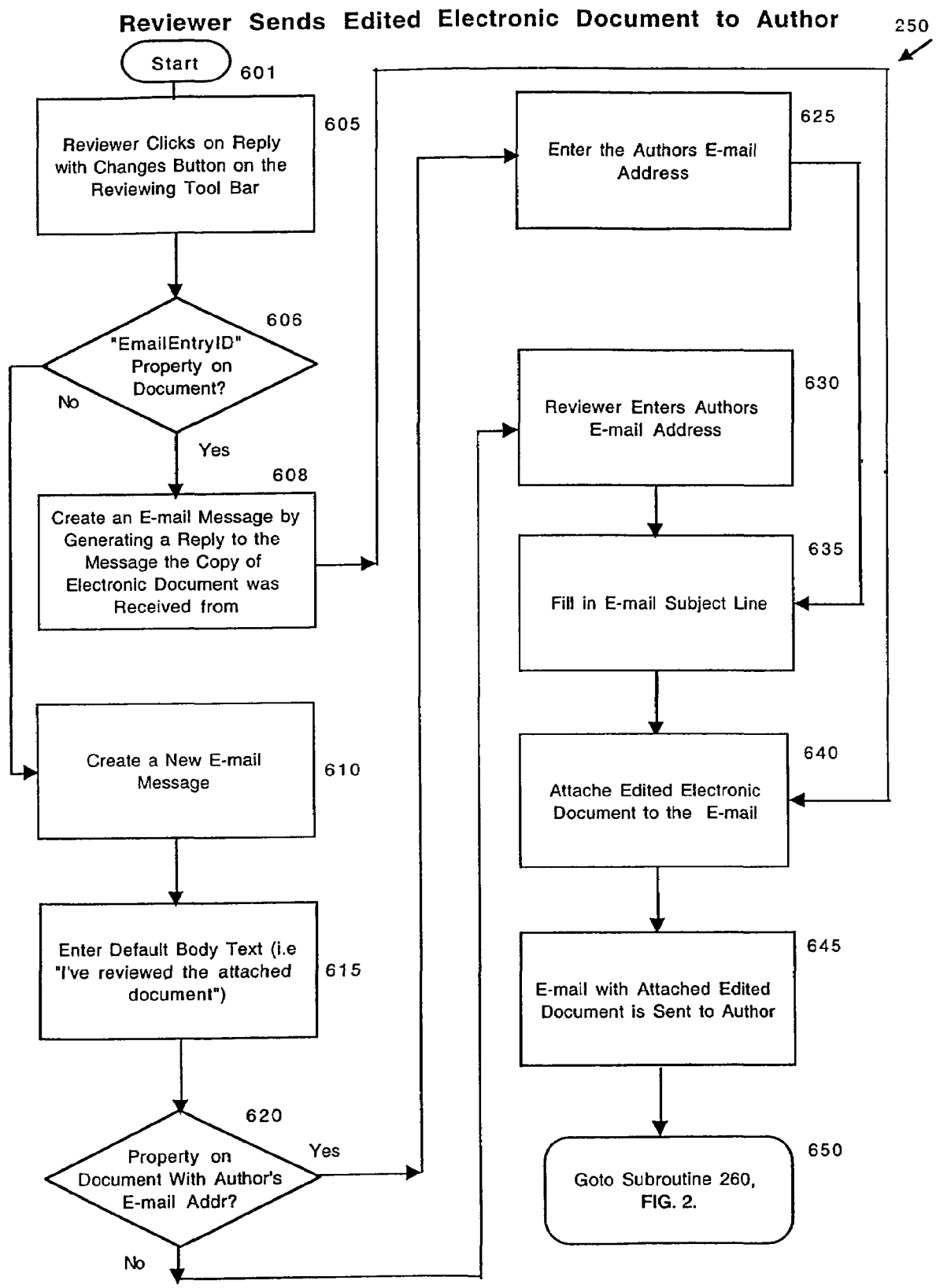
Figure 7:
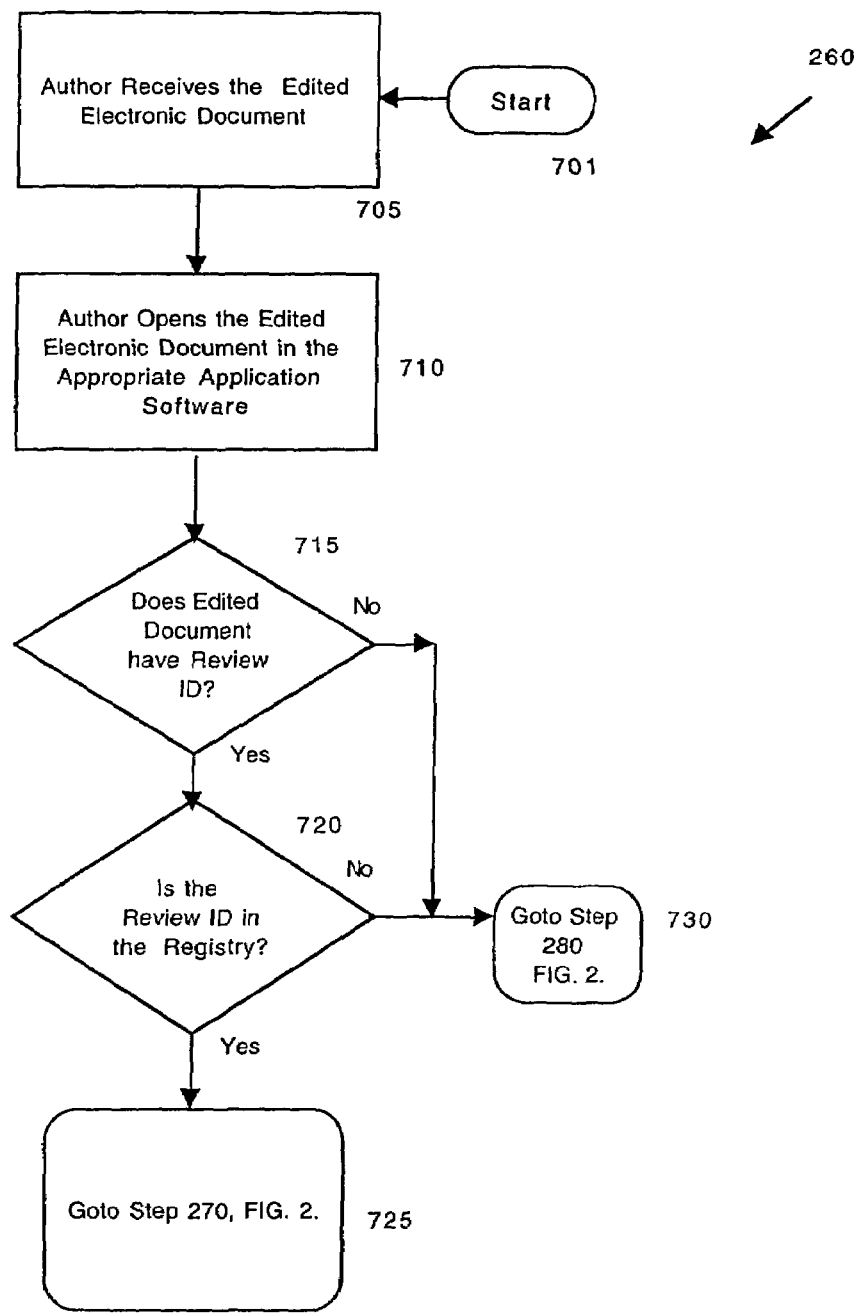

Exemplary method 200 continues to subroutine 250, where the reviewer sends the edited electronic document to the author. The steps of subroutine 250 are shown in FIG. 6 and will be described in greater detail below. Next the method continues to subroutine 260, where the author receives the edited electronic document from the reviewer and then finally to subroutine 270 where the author merges changes from the edited electronic document with the electronic document. The location of the electronic document in the memory of the author's computer is identified in a property attached to the edited electronic document. The steps of subroutine 260 and 270 are shown in FIG. 7 and FIG. 8 respectively and will be described in greater detail below. Exemplary method 200 ends at step 280.

Turning now to FIG. 3, describing the exemplary subroutine 210 from FIG. 2 in which the location of the electronic document is identified in the memory of the author's computer. Subroutine 210 begins at starting block 301 and advances to step 305 where the author attaches the electronic document to be reviewed with an electronic mail message. The attachment of the document can be performed in several ways including, 1) pasting the contents of the electronic document into an electronic mail message, 2) dragging a selectable control element associated with the electronic document into the body of the electronic mail message, 3) inserting a file corresponding to the electronic document in the electronic mail message by using an "insert file" feature of an electronic mail program module, or 4) using a "send to>>mail recipient" feature within a document editing program module, or 5) by forwarding an electronic mail message to the recipient with a previously attached copy of the electronic document. Subroutine 210 tests for each of the above methods of attachment as described in the following paragraphs.

At decision block 310 it is determined if the author attached the document by pasting. If the author attached the document by pasting, the method continues to decision block 325, where the location of the electronic document in the memory is identified. This location in memory is used to create a unique ID and is explained in greater detail in the discussion of FIG. 4. If the document was not attached by pasting, then the method continues to decision block 315 where it is determined if the author attached the document by dragging. If the author attached the document by dragging, the method continues to decision block 325, for identification of the memory location. If the document was not attached by dragging, the method continues to decision block 320 where the method determines if the author attached by using an insert file feature. If the author attached the document by using an insert file feature, the method continues to step 325 for identification of the memory location.

From step 325, the method proceeds to step 330 and returns to subroutine 220 of FIG. 2. From decision 320, if the author did not attach the document using an insert file feature, the method continues to block 335, where it is determined if the user attached using a "send to>>mail recipient (as attachment)" feature of a document editing program module. If the author attached the document using "send to>>mail recipient (as attachment)", the method continues to step 340 where the memory location of the electronic document is stored in a registry key. A registry key is a location in memory where name-value pairs may be stored. From step 340 the method continues to step 330 and returns to subroutine 220 of FIG. 2. If at decision 335 it was determined that the author did not attached using a "send to>>mail recipient (as attachment)" feature of a document editing program module, then the method continues to decision step 345 to determine if the author is forwarding an electronic mail with an attachment. If this is true, the method continues to step 350 and no special processing is performed and no reviewing feature is enabled. No special processing can be performed because the system cannot determine the location of the document in the memory since the document did not originate with the author's computer. From step 350, the method continues to step 355 and returns to step 280, FIG. 2.

Turning now to FIG. 4, describing subroutine 220 from FIG. 2, in which the author invokes a command to send a copy of the electronic document to the reviewer. Subroutine 220 begins with starting block 401 and advances to step 405 where the author sends the copy of the electronic document to the reviewer. The method continues to decision block 430, where it is determined if the author previously invoked a command to disable the review feature of the document editing program with respect to the electronic document. Review features would be disabled if the author was simply sending an attached document to a recipient and had no intentions for the document to be reviewed. If the review features are disabled, the method continues to step 440 and returns to step 280 of FIG. 2 where no further reviewing features are performed.

Next, subroutine 220 continues to step 450 where a unique ID for the attachment is generated. For example, an ID may be generated by running 32 bit checksum algorithm on the numerical address identifier corresponding to the disk or other memory device location of the electronic document in the author's computer. To make this ID unique, before numerical address identifier is run through the 32 bit checksum algorithm, it may be prepended with a unique sequence for the author. This sequence is a "Global Unique Identifier" (GUID), which is a unique 128 bit number created using the current date and time and other factors.

This unique ID along with the location of the electronic document in the memory are stored as a name value pair in the registry. The registry is a special data structure located on the author's computer. The purpose for the unique ID is to provide the electronic document with a property that identifies it as one to be reviewed, as well as identifies the location of the electronic document in the author's computer.

From step 450, the subroutine 220 continues to step 455 where the unique ID is added as appropriate to the attachment. At this point the unique ID is referred to as the review ID. From step 455 subroutine 220 continues to decision block 460 where it is determined from user input if the authors electronic mail address should be added to the attachment. If the author's electronic mail address should be added to the attachment, the subroutine continues to step 465 where a property is added to the attachment indicating the author's electronic mail address. In this case, adding a property means creating a data structure containing information indicating the author's electronic mail address and adding this data structure to the electronic document. The author's electronic mail address may be added so that the reviewer does not have to determine the author's electronic mail address when the edited electronic document is returned. However, due to privacy issues, an author may not wish to publish the author's electronic mail address. Therefore, the author may be presented with the choice to add the author's electronic mail address. If at step 460 it was determined from user input that the author's electronic mail address should not be added to the attachment, or after the electronic mail address property is added at step 465, the subroutine continues to step 470 and returns to subroutine 230, FIG. 2.

Turning now to FIG. 5, describing subroutine 230 from FIG. 2, in which the reviewer receives a copy of the electronic document. Subroutine 230 begins at starting block 501 and proceeds to step 503 where the reviewer receives an electronic mail message with the copy of the electronic document attached. When the reviewer opens the electronic mail message with the electronic mail program module, a "EmailEntryID" property is added to the attached copy of the electronic document if the document contains a review ID property. The "EmailEntryID" property uniquely identifies the electronic mail message on which the copy of the electronic document arrived. From step 503, the method continues to step 505 where the reviewer opens the copy of the electronic document in application program module. The method continues to decision block 510 where the copy of the electronic document is checked for a review ID. If the copy of the electronic document does not have a review ID, the method continues to step 520 where no review is performed. From step 520, the subroutine 230 proceeds to step 525 and returns to step 280 of FIG. 2. If at decision block 510 the copy of the electronic document is found to have a review ID, the method continues to decision block 515 where the registry is checked to see if it contains the review ID. If the registry contains the review ID, then the document must presently be on the author's computer because only the author's computer has this unique review ID in the registry. If the document is received by the author's computer, then the method continues to step 520 where no review is performed. From step 520, the subroutine 230 proceeds to step 525 and returns to step 280, of FIG. 1f the registry does not contain the review ID, the method continues to decision block 530 where the copy of the electronic document is checked to see if it contains a "reviewing tools shown once" property. The "reviewing tools shown once" property allows for the reviewing tool bar to be shown once. The reviewing tool bar may contain selectable control elements corresponding to feature contained in the document editing program module. For example, some the features may include, the ability to alter the color of selected text, underline selected text, or to enable the changes made to the text to be tracked. In addition, the reviewing tool bar may include a "reply with changes" feature for sending the edited document via electronic mail, once the reviewer has performed edits. Upon the first time the reviewer opens the copy of the electronic document, the reviewing tool bar is displayed. However, if the reviewer removes the tool bar from the display, or on any subsequent open of the copy of the electronic document, the system will not automatically cause the reviewing tool bar to reappear. If the document contains this property, the method continues to step 535, where the reviewing tool bar is displayed and the "reviewing tools shown once" property is set on the document. This property is set on the document in order that a subsequent opening of the document will not cause the reviewing tool bar to be displayed. From step 535 or if at decision 530 the document does have a "reviewing tools shown once" property, the method continues to step 540 where the reviewer reviews and edits the copy of the electronic document to create an edited electronic document. From step 540 the method proceeds to step 545 and returns to subroutine 250 of FIG. 2.

Turning now to FIG. 6, describing subroutine 250 from FIG. 2, where the reviewer sends the edited electronic document to the author. Subroutine 250 begins at starting block 601 and advance to step 605 where the reviewer clicks on the "reply with changes" button on the reviewing tool bar. The reply with changes button on the reviewing tool bar initiates the sending of the edited document to the author. From step 605 the method continues to step 606 where the edited electronic document is checked for an "EmailEntryID" property. If this property is present, the method advances to step 608 where an electronic mail message is created by generating a reply to the electronic mail message from which the copy of the electronic document was received. The electronic mail message from which the copy of the electronic document was received is located using the "EmailEntryID" property. From step 608 the method advances to step 640. If an "EmailEntryID" property in not present, the method continues to step 610 where a new electronic mail message is created. Preferably, the reviewer's document editing program communicates with an electronic mail program to automatically create an electronic mail message.

Next, the method proceeds to step 615 where the system enters a default body text to the electronic mail message. For example, the default text may be "I've reviewed the attached document". From step 615, the method continues to decision block 620, where the edited document is checked to see if it contains a property identifying the author's electronic mail address. Since the edited electronic document is merely and edited version of the copy of the electronic document, the edited electronic document contains the same properties as the copy of the electronic document. These properties may include the review ID or a property indicating the author's electronic mail address. If the document contains this electronic mail property, the method continues to step 625 where the system enters the author's electronic mail address into the new electronic mail message header. If at decision block 620, the document does not contain the author's electronic mail address, the system continues to step 630 where the reviewer is prompted to enter the author's electronic mail address. From step 625 or step 630, the method proceeds to step 635 where the system fills in the electronic mail subject line based on the subject line string property of the aforementioned automatically created electronic mail message.

Next, the edited electronic document is attached to the electronic mail message at step 640. From step 640, the method proceeds to step 645 where the electronic mail message with the attached edited electronic document is sent to the author. From step 645 the method continues to step 650 where it returns to subroutine 260, FIG. 2.

Turning now to FIG. 7, describing subroutine 260 of FIG. 2 where the author receives the edited electronic document from the reviewer. Subroutine 260 begins at starting block 701 and then moves to step 705 where the author receives the edited electronic document. From step 705 subroutine 260 proceeds to step 710, where the author opens the edited electronic document in the appropriate application software. Next, from step 710 the method continues to decision block 715 where the electronic document is checked for a review ID indicating that the document was one sent for review. If the document does not contain a review ID, the method continues to step 730 where it returns to step 280 of FIG. 2. Without a review ID, the document was not intended to be for review thus no merger is required so the method ends. If the document contains a review ID the method proceeds to step 720 where the registry is check to see if the review ID is in the registry. If the ID is in the registry, then the memory location of the electronic document will be in the registry corresponding to the review ID. If the review ID is not in the registry, the system proceeds to step 730 where the method returns to step 280 of FIG. 2. Because the review ID was not in the registry, the document was not intended to be for review thus no merger is required so the method ends. If the review ID is in the registry, the method continues to step 725, where it returns to subroutine 270, FIG. 2 since the document has been identified as one sent for review.

Turning now to FIG. 8, describing subroutine 270 of FIG. 2 where the author merges changes from the edited electronic document with the electronic document. Subroutine 270 begins at starting block 801 and proceeds to step 805 where the system displays an alert. The Alert is a prompt to determine if the author wishes to merge changes. Method 800 then continues to decision block 810 where it is determined if the author wishes to merge the changes. If the author does not wish to merge the changes, the method proceeds to step 825 where the method returns to step 280, FIG. 2.

If the author does wish to merge changes, the method continues through a series of decisions at steps 835, 840, and 850, where it is determined if the edited document has a review ID, if the ID is in the registry and if there is a "ReviewingToolsOnce" setting. If any of these conditions of steps 835, 840, and 850 are not met, the method continues to step 825 where it returns to step 280, FIG. 2. As previously explained, if the document does not contain a review ID or if the ID is not in the registry, the document was never meant for review, thus no merging is possible. If all of the above conditions are satisfied, the method continues to step 855 where the edited electronic document is merged into the electronic document and then to step 857 where the reviewing tool bar is displayed.

From step 857 the method continues to decision block 860 where user input determines if the author wishes to end the review process and complete the review cycle on the electronic document. If the author wishes to end the review, the method continues to step 825 where it returns to step 280, FIG. 2. If not, the method continues to step 857 causing the reviewing tool bar to remain on the display device until the author ends the review cycle on the electronic document by selecting a button on the reviewing tool bar to cause such termination.

In view of the foregoing, it will be appreciated that the present invention provides a method and system for electronic document review and merging. Still, it should be understood that the foregoing relates only to the exemplary embodiments of the present invention, and that numerous changes may be made thereto without departing from the spirit and scope of the invention as defined by the following claims.

We claim:

1. A computer-implemented method for reviewing and editing the electronic document, the method comprising:

receiving from the first computer a copy of the electronic document having a first property identifying a location of the electronic document in the memory of the first computer;

in response to receiving the copy of the electronic document, opening the copy of the electronic document within an application program and displaying the copy of the electronic document on a display device;

determining whether a review identifier associated with the copy of the electronic document is included in a registry, wherein the inclusion of the review identifier in the registry indicates the presence of the electronic document on the first computer;

in response to detecting the first property with the application program and determining that the review identifier is not in the registry, displaying on the display device a review toolbar;

editing the copy of the electronic document to create an edited electronic document; and sending the edited electronic document to the first computer, said edited electronic document having said first property and the review identifier.

2. The method of claim 1, wherein the first property comprises a unique identification number identifying the location of the electronic document in the memory.

3. The method in claim 1, wherein the first property is a custom OLE document property.

4. The method of claim 1, wherein the copy of the electronic document was received via electronic mail; and wherein the copy of the electronic document further comprises a second property indicating an electronic mail address from which the copy of the electronic document was sent.

5. The method in claim 4, wherein said second property is a custom OLE document property.

6. The method of claim 1, wherein the first property is created in response to attaching said electronic document to an electronic mail message.

7. The method of claim 1, wherein the first property is created in response to detecting that a selectable control element corresponding to the electronic document has been dragged into an electronic mail message body.

8. The method of claim 1, wherein the first property is created in response to detecting that the copy of the electronic document has been pasted into an electronic mail message body.

9. The method in claim 1, wherein the review toolbar is continuously displayed until the review toolbar is removed from the display device.

10. A computer system for reviewing an electronic document, the system comprising:

a memory for storing an electronic document; and a processing unit functionally coupled to the memory, for executing computer-executable instructions operable for:

sending to a computer a copy of the electronic document, said copy having a first property identifying the location of the electronic document in the memory and indicating that review of the copy has been requested, receiving from the computer an edited electronic document, said edited electronic document comprising an edited version of the electronic document, and said edited electronic document having said first property and the review identifier, determining whether the review identifier is in a registry, wherein the inclusion of the review identifier in the registry indicates that the electronic document is a reviewed document;

when the review identifier is in the registry, retrieving the electronic document from the memory according to the first property, and automatically merging the edited electronic document into the electronic document; and when the review identifier is not in the registry, not performing a merge operation.

11. The system of claim 10, wherein the first property is created in response to attaching said electronic document to an electronic mail message.

12. The system of claim 10, wherein the first property is created in response to detecting that a selectable control element corresponding to the electronic document has been dragged into an electronic mail message body.

13. The system of claim 10, wherein the first property is created in response to detecting that the copy of the electronic document has been pasted into an electronic mail message body.

14. The system of claim 10, wherein the first property comprises a unique identification number identifying the location of the electronic document in the memory.

15. The system in claim 10, wherein the first property is a custom OLE document property.

16. The system of claim 10, wherein the copy is received via electronic mail; and wherein the copy further comprises a second property indicating an electronic mail address from which the copy was sent.

17. The system in claim 16, wherein said second property is a custom OLE document property.

18. A computer-readable storage medium having computer-executable instructions for storing an electronic document, the instructions comprising:

receiving an edited electronic document from a computer, said edited electronic document comprising an edited version of the electronic document, said edited electronic document having a first property identifying a location of the electronic document in the memory and a review identifier that indicates that review of the copy has been requested;

determining whether the review identifier is in a registry, wherein the inclusion of the review identifier in the registry indicates that the electronic document is a reviewed document;

when the review identifier is in the registry, retrieving the electronic document from the memory according to the first property, and automatically merging the edited electronic document into the electronic document; and when the review identifier is not in the registry, not performing a merge operation.

19. The computer-readable storage medium of claim 18, wherein the first property comprises a unique identification number.

20. The computer-readable storage medium in claim 18, wherein the first property is a custom OLE document property.

21. The computer-readable storage medium of claim 18, wherein the copy of the electronic document was received by the computer via electronic mail; and wherein the copy of the electronic document further comprises a second property indicating an electronic mail address from which the copy of the electronic document was sent.

22. The computer-readable storage medium in claim 21, wherein said second property is a custom OLE document property.

* * * * *